United States Patent
Sugimoto et al.

(10) Patent No.: US 7,147,802 B2
(45) Date of Patent: Dec. 12, 2006

(54) PHOSPHOR AND METHOD FOR PRODUCTION THEREOF AND PLASMA DISPLAY DEVICE

(75) Inventors: Kazuhiko Sugimoto, Kyoto (JP); Mitsuhiro Otani, Osaka (JP); Hiroyuki Kawamura, Osaka (JP); Masaki Aoki, Osaka (JP); Junichi Hibino, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 214 days.

(21) Appl. No.: 10/478,857

(22) PCT Filed: Dec. 20, 2002

(86) PCT No.: PCT/JP02/13361

§ 371 (c)(1),
(2), (4) Date: Nov. 25, 2003

(87) PCT Pub. No.: WO03/054110

PCT Pub. Date: Jul. 3, 2003

(65) Prior Publication Data

US 2004/0150338 A1 Aug. 5, 2004

(30) Foreign Application Priority Data

Dec. 21, 2001 (JP) ............................ 2001-389143

(51) Int. Cl.
*C09K 11/59* (2006.01)
*H01J 17/16* (2006.01)

(52) U.S. Cl. ................ 252/301.4 F; 313/582; 313/584; 313/486

(58) Field of Classification Search ............... None
See application file for complete search history.

(56) References Cited

U.S. PATENT DOCUMENTS

| 2,169,046 | A | * | 8/1939 | Headrick .................... 313/400 |
| 4,315,190 | A | * | 2/1982 | Peters et al. ................ 313/467 |
| 4,551,397 | A | * | 11/1985 | Yaguchi et al. ............. 428/691 |
| 4,767,567 | A | | 8/1988 | Kiss et al. |
| 6,716,369 | B1 | * | 4/2004 | Jung et al. ............ 252/301.4 F |

FOREIGN PATENT DOCUMENTS

| JP | 51-83889 | | 7/1976 |
| JP | 60-233188 | | 11/1985 |
| JP | 3-205481 | | 9/1991 |
| JP | 2001-11437 | | 1/2001 |
| WO | WO 00/71636 | * | 11/2000 |
| WO | 01/29147 | | 4/2001 |

OTHER PUBLICATIONS

Phosphor Handbook, p. 219-220, published from Ohm Co., Ltd., Dec. 25, 1987 with a partial translation.
M. Shiiki et al., "Thermal degradation of PDP phosphors", Technical Report of IEICE. EID99-94, Jan. 2000.

* cited by examiner

Primary Examiner—C. Melissa Koslow
(74) Attorney, Agent, or Firm—Wenderoth, Lind & Ponack, L.L.P.

(57) ABSTRACT

The present invention relates to a plasma display device apt to increase luminance of a phosphor layer and prevent degradation of a discharge characteristic, and to a phosphor used for the device. This plasma display device has a green phosphor having a crystal structure of $Zn_2SiO_4$:Mn, and a monovalent oxide is substituted for part of the green phosphor. The monovalent oxide is one or more of lithium oxide ($Li_2O$), sodium oxide ($Na_2O$), potassium oxide ($K_2O$), cesium oxide ($Cs_2O$), rubidium oxide ($Rb_2O$), copper oxide ($Cu_2O$), and silver oxide ($Ag_2O$). This structure allows reduction of oxygen defects occurring in the green phosphor, suppression of the luminance decrease of the green phosphor, and improvement of a discharge characteristic.

4 Claims, 4 Drawing Sheets

PHOSPHOR AND METHOD FOR PRODUCTION THEREOF AND PLASMA DISPLAY DEVICE

TECHNICAL FIELD

The present invention relates to a plasma display device that is used in a color television receiver or a display for displaying a character or an image and employs a plasma display panel (PDP) using a gas discharge emission.

BACKGROUND ART

A display device using a plasma display panel (PDP) has recently received attention as a color display device used for displaying an image in a computer and a television, because this display device using the PDP can be large, thin, and light.

The PDP allows full color display by adding and mixing three so called primary colors (red, green, and blue). For displaying full colors, the PDP has a phosphor layer for emitting light of each of the three primary colors, namely red (R), green (G), and blue (B). Phosphor particles constituting the phosphor layer are excited by ultraviolet rays generated in a discharge cell of the PDP to generate visible light of each color.

Compounds employed for the phosphors of respective colors are, for example, $(Y_{1-y}Gd_y)BO_3:Eu^{3+}$ ($0 \leq y \leq 1$) or $Y_2O_3:Eu^{3+}$ for emitting red light, $Zn_2SiO_4:Mn^{2+}$ for emitting green light, and $BaMgAl_{10}O_{17}:Eu^{2+}$ for emitting blue light. These phosphors are produced by mixing predetermined raw materials and then by calcining them at a high temperature of 1000° C. or higher for solid phase reaction (for example, Phosphor Handbook, P219–220, Ohmsha, Ltd.). Phosphor particles produced by this calcination are crushed and classified as red and green particles with an average grain size of 2 to 5 μm and blue particles with an average grain size of 3 to 10 μm and then used.

The crushing and classification of the phosphor particles are performed for the following reason. In forming the phosphor layer in the PDP, a method of deforming the phosphor particles of each color to paste and silk-screening the paste is generally employed. A flatter coated surface can thus be easily obtained when grain sizes of the phosphor particles are smaller and more uniform (uniform grain size distribution). In other words, when grain sizes of the phosphor particles are smaller and more uniform and their shapes are closer to spherical, the coated surface is flatter, filling density of the phosphor particles in the phosphor layer increases, light emitting surface area of the particles increases, instability in address driving is improved, and hence theoretical luminance of the PDP can be increased.

When the grain sizes of the phosphor particles are smaller, however, the surface area of the phosphor particles increases or defects in the surfaces of the phosphor particles increase. Much hydrocarbon organic gas or water or carbonated gas is therefore apt to adhere to the surfaces of the phosphor particles. Especially, green phosphor composed of $Zn_2SiO_4$:Mn has defects (mainly, oxygen defects) in surfaces of crystals or in the crystals, and is apt to adsorb hydrocarbon gas or water existing in the air comparing with blue and red phosphors. Hydrocarbon gas or carbonated gas generated especially in calcining the phosphor is often adsorbed to the green phosphor during or after the cooling process in the calcining. Therefore, disadvantageously, after sealing the panel, the hydrocarbon gas is released in the panel by electric discharge and hence reacts with the phosphor or MgO to decrease the luminance, decrease a driving margin, or increase discharge voltage.

Since the conventional phosphor of $Zn_2SiO_4$:Mn has many defects near the surface, the following problem occurs. Specifically, when a phosphor layer is formed in a method of applying phosphor ink from a nozzle, an organic binder reacts with the phosphor to clog the nozzle.

The present invention addresses the problems discussed above. The defects (mainly, oxygen defects) in the green phosphor are eliminated, thereby suppressing the surface of the green phosphor from adsorbing the hydrocarbon gas or water, suppressing luminance decrease or chromaticity change of the phosphor, and improving a discharge characteristic.

SUMMARY OF THE INVENTION

The present invention provides a plasma display device having a PDP in which a plurality of discharge cells of one color or a plurality of colors are arranged, a phosphor layer having a color corresponding to the color of each discharge cell is disposed, and the phosphor layer is excited by ultraviolet rays to emit light. The phosphor layer has a green phosphor having a crystal structure of $Zn_2SiO_4$:Mn that is excited by the ultraviolet rays to emit visible light, and a monovalent oxide is substituted for part of the green phosphor. The monovalent oxide is one or more of lithium oxide ($Li_2O$), sodium oxide ($Na_2O$), potassium oxide ($K_2O$), cesium oxide ($Cs_2O$), rubidium oxide ($Rb_2O$), copper oxide ($Cu_2O$), and silver oxide ($Ag_2O$).

This structure allows reduction of oxygen defects occurring in the green phosphor, suppression of the luminance decrease of the green phosphor, and improvement of a discharge characteristic such as reduction of address discharge failure in driving the plasma display device.

DETAILED DESCRIPTION OF PREFERRED EMBODIMENTS

Figure 1:
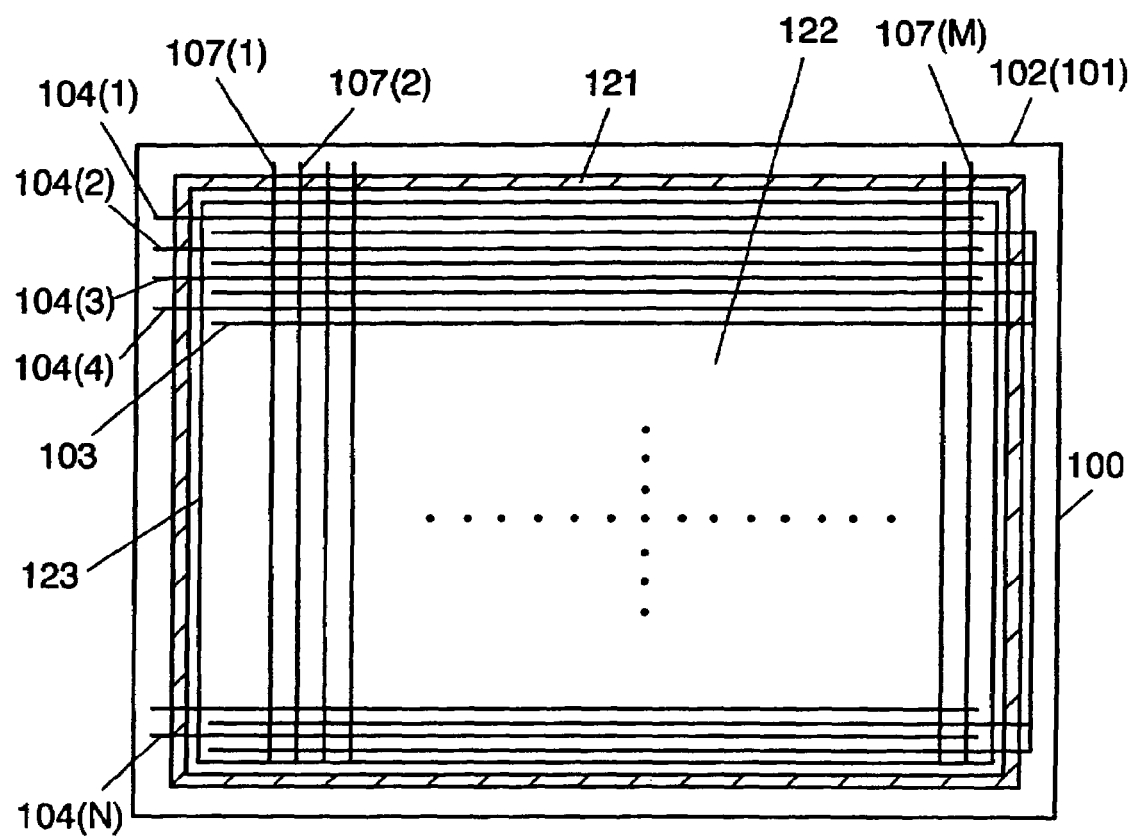
FIG. 1 is a plan view showing a PDP having no front glass substrate in accordance with an exemplary embodiment of the present invention.

A phosphor used in a PDP is manufactured in a solid phase reaction method or an aqueous solution reaction method, but is apt to generate defects when grain size of the phosphor is small. Especially in the solid phase reaction method, it is known that many defects occur when the phosphor is calcined and then crushed. It is known that defects occur in the phosphor also due to ultraviolet rays with a wavelength of 147 nm generated by electric discharge performed in driving a panel (for example, The Institute, Electronics, Information and Communication Engineers, Technology Research Report, EID99–94, Jan. 27, 2000).

Especially, $Zn_2SiO_4$:Mn as a green phosphor is apt to generate oxygen defects in addition to the defects discussed above because the phosphor is produced by adding excess $SiO_2$ to ZnO and calcining them at 1100 to 1300° C. (Phosphor Handbook, PP 220, 1987, Ohmsha, Ltd.).

We found the following facts. Luminance of the green phosphor is not decreased only by existence of defects. Hydrocarbon gas and carbonated gas are adsorbed selectively to the defects (mainly, oxygen defects), and ultraviolet rays or ions are radiated to the adsorbed place to react the phosphor with the gases, thereby resulting in luminance decrease and color drift. In other words, the oxygen defects near Zn—O and Si—O in the green phosphor adsorb hydrocarbon gas and carbonated gas, thereby resulting in various degradations. In consideration of these facts, by decreasing the oxygen defects in the green phosphor, the degradations of the green phosphor are prevented in a panel manufacturing process and in driving the panel without decreasing the luminance of the green phosphor in the present invention.

For decreasing the oxygen defects in the green phosphor, a monovalent oxide $M_2O$ (where, M is one or more of Li, Na, K, Rb, Cs, Cu, and Ag) is added to green phosphor $(Zn_{1-x}Mn_x)_2SiO_4$ having a crystal structure of $Zn_2SiO_4$:Mn, and the monovalent oxide is substituted for a part of the green phosphor. As a result, the luminance decrease of the green phosphor and address discharge failure are intended to be reduced (improvement of the discharge characteristic).

A green phosphor, namely oxide having a crystal structure of $Zn_2SiO_4$ (Mn is substituted for Zn), generally generates electrons due to oxygen defects and defects by thermal dissociation. In other words, electrons having a minus charge occur for compensating the plus electrification of the oxygen defects. The oxygen defects and electrons are considered to relate to the adsorption of hydrocarbon gas.

Monovalent ions are added to (substituted for) bivalent or quadrivalent ions of Zn, Mn, and Si constituting the green phosphor, thereby suppressing the oxygen defects and reducing occurrence of electrons. Therefore, adsorption of hydrocarbon is reduced.

A manufacturing method of the phosphor of the present invention will be hereinafter described.

As the manufacturing method of the phosphor body, a solid phase reaction method, a liquid phase method, or a liquid spraying method is considered. In the solid phase reaction method, conventional oxide or carbonated raw material is sintered using flux. In the liquid phase method, a precursor of a phosphor is formed using a coprecipitation process and then thermally treated. Here, in the coprecipitation process, organic metallic salt and nitrate are hydrolyzed in aqueous solution or alkalis or the like is added to them, thereby precipitating them. In the liquid spraying method, aqueous solution containing the phosphor material is sprayed into a heated furnace. Even when the phosphor manufactured in any method is used, an effect is obtained by adding monovalent oxide to the phosphor of $(Zn_{1-x}Mn_x)_2SiO_4$.

A manufacturing method of a green phosphor by the solid phase reaction method is described as an example. Carbonated material or oxide such as ZnO, $SiO_2$, $MnCO_3$, and $M_2O$ (where, M is one or more of Li, Na, K, Rb, Cs, Cu, and Ag) is used as raw material. The ZnO, $SiO_2$, and $MnCO_3$ are firstly mixed so as to provide a mol ratio corresponding to composition $[(Zn_{1-x}Mn_x)_2SiO_4]$ of phosphor base material, $M_2O$ is added by 0.001 to 0.5 wt % to the $[(Zn_{1-x}Mn_x)_2SiO_4]$, and the materials are calcined for 2 hours at 1100 to 1300° C., crushed, and then classified, thereby forming a phosphor.

The liquid phase method of manufacturing a phosphor from aqueous solution will now be described. Nitrate or organic metallic salt (for example, alkoxide or acetylacetone) containing elements (Zn, Si, Mn, Li, Na, K, Rb, Cs, Cu, or Ag) constituting a phosphor is firstly dissolved in water and hydrolyzed to produce precipitate (hydrate). The precipitate is crystallized in an autoclave by hydrothermal synthesis, calcined in the air, or sprayed into a high-temperature furnace, thereby producing a powder body. The powder body is crushed and then calcined again for 2 hours, in the air, and at 1100 to 1300° C., thereby producing a phosphor.

A substituting ratio of monovalent oxide $M_2O$ for $(Zn_{1-x}Mn_x)_2SiO_4$ is preferably 0.001 to 0.5 wt %. When the substituting ratio is 0.001 wt % or less, the luminance decrease and the address failure cannot be prevented. When the substituting ratio is 0.5 wt % or more, $M_2O$ becomes an impurity to decrease the luminance of the phosphor.

Since monovalent ions are thus substituted for part of Zn, Si, or Mn ions in $(Zn_{1-x}Mn_x)_2SiO_4$ crystal in the conventional green phosphor manufacturing process, a green phosphor that has no luminance decrease and is durable against hydrocarbon gas and carbonated gas is obtained. Here, the hydrocarbon gas and carbonated gas have occurred in a phosphor calcining process, a panel sealing process, a panel aging process, or a panel driving time.

Since substituting monovalent ions decreases defects, when the phosphor is mixed with an organic binder to manufacture phosphor ink, reaction of the phosphor and the binder is reduced. Therefore, even when a phosphor layer is formed in a method of applying this ink from a nozzle, the nozzle is not clogged and a uniform coated film can be obtained.

When grain sizes of the green phosphor particles are small, namely 0.05 to 3 μm, the grain size distribution is sufficient, and the phosphor particles forming the phosphor layer are spherical, the filling density increases and light emitting area of the phosphor particles substantially contributing to light emission increases. Therefore, the luminance of the PDP increases, and a plasma display device having a high luminance characteristic such as suppressed luminance decrease and color drift can be obtained.

An average grain size of the phosphor particles is preferably in a range of 0.1 to 2.0 μm, and a maximum grain size of the grain size distribution is not more than 4 times the average value and a minimum grain size is not less than ¼ times the average value. Depth to which ultraviolet rays reach in each phosphor particle is short, namely about several hundreds nm from the surface of the particle, and the substantially only surface emits light. When the grain sizes of the phosphor particles are 2.0 μm or less, the surface area of the particles contributing to light emission increases and the luminous efficiency of the phosphor layer is kept high. When the grain sizes are 3.0 μm or more, the thickness of the phosphor must be 20 μm or more and a discharge space cannot be ensured sufficiently. When the grain sizes are 1.0 μm or less, defects are apt to occur and luminance does not increase.

When the thickness of the phosphor layer is in a range of 8 to 25 times the average grain size of the phosphor particles, the luminous efficiency of the phosphor layer is kept high and the discharge space can be ensured sufficiently. The luminance of the PDP can be increased. Especially, when the average grain size of the phosphor is 3 μm or less, this effect is large.

The phosphor particles used for the green phosphor layer of the PDP can specifically be composed of a compound in which $(Zn_{1-x}Mn_x)_2SiO_4$ is the base material and monovalent oxide $M_2O$ (where, M is one or more of Li, Na, K, Rb, Cs, Cu, and Ag) is substituted by 0.001 to 0.5 wt %. For increasing the luminance and preventing the luminance decrease, the value of X in this formula preferably satisfies $0.01 \leq X \leq 0.2$.

The phosphor particles used for a blue phosphor layer can specifically be composed of a compound represented by the formula $Ba_{1-x}MgAl_{10}O_{17}:Eu_x$ or $Ba_{1-x-y}Sr_yMgAl_{10}O_{17}:Eu_x$. For increasing the luminance, the values of X and Y in this formula preferably satisfy $0.03 \leq X \leq 0.20$ and $0.1 \leq Y \leq 0.5$. The phosphor particles used for a red phosphor layer can specifically be composed of a compound represented by the formula $Y_{2-x}O_3:Eu_x$ or $(Y_{1-y},Gd_y)_{1-x}BO_3:Eu_x (0 \leq y \leq 1)$. For increasing the luminance and preventing the luminance decrease, the value of X in this formula preferably satisfies $0.05 \leq X \leq 0.20$.

A manufacturing method of a PDP of the present invention has the following processes:

an applying process of applying, onto a substrate of one panel, paste which includes phosphor particles obtained by substituting a monovalent oxide for part of the green phosphor $(Zn_{1-x}Mn_x)_2SiO_4$, red and blue phosphor particles, and a binder;

a calcining process of removing the binder contained in the paste applied onto the panel; and a process of overlapping and sealing the panel having the phosphor particles applied on the substrate in the calcining process and the other panel.

A plasma display device in accordance with an exemplary embodiment of the present invention will be described hereinafter with reference to the accompanying drawings.

Figure 2:
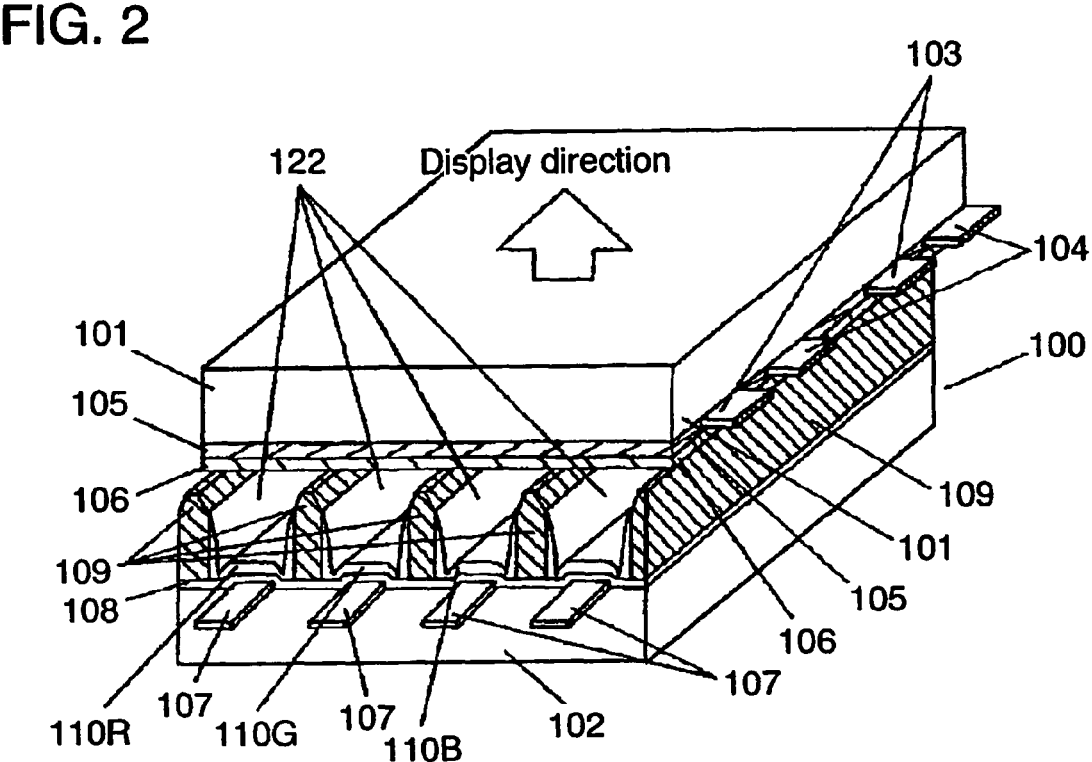
FIG. 2 is a perspective view of a structure of an image display region of the PDP in accordance with the exemplary embodiment.

FIG. 1 is a schematic plan view of a PDP having no front glass substrate, and FIG. 2 is a partially sectioned perspective view of an image display region of the PDP. In FIG. 1, display electrodes, display scan electrodes, and address electrodes are illustrated, but all of them are not shown for the sake of clarity. A structure of the PDP is described with reference to FIG. 1 and FIG. 2.

In FIG. 1, PDP 100 has front glass substrate (not shown), back glass substrate 102, N display electrodes 103, N display scan electrodes 104 (the number within the parentheses indicates an ordinal number), M address electrodes 107 (the number within the parentheses indicates an ordinal number), and airtight seal layer 121 shown by a shaded area. Electrodes 103, 104, 107 constitute an electrode matrix having a three-electrode structure. Cells are formed at intersection points of display scan electrodes 104 and address electrodes 107. Front glass substrate 101 and back glass substrate 102 form discharge space 122 and display region 123.

PDP 100 has a structure in which a front panel and a back panel are bonded together and electric discharge gas is filled into discharge space 122 formed between the front panel and the back panel. As shown in FIG. 2, the front panel is formed by arranging display electrodes 103, display scan electrodes 104, dielectric glass layer 105, and MgO protective layer 106 on one main surface of front glass substrate 101. The back panel is formed by arranging address electrodes 107, dielectric glass layer 108, barrier ribs 109, and phosphor layers 110R, 110G, 110B on one main surface of back glass substrate 102. PDP 100 is coupled to PDP driving device 150 shown in FIG. 3 to constitute the plasma display device.

Figure 3:
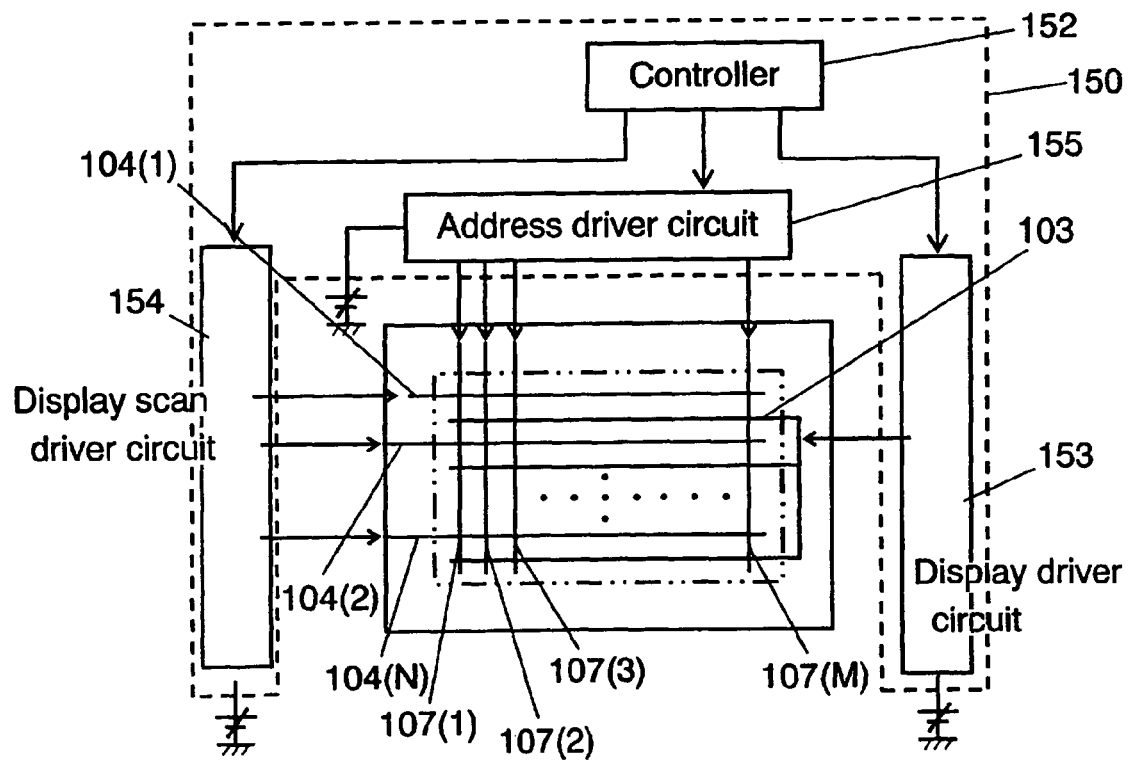
FIG. 3 is a block diagram of a plasma display device in accordance with the exemplary embodiment.

In driving the plasma display device, as shown in FIG. 3, display driver circuit 153, display scan driver circuit 154, and address driver circuit 155 are firstly coupled to respective electrodes of PDP 100. A voltage is then applied between display scan electrode 104 and address electrode 107 in the cell to be lighted in response to control of controller 152, thereby performing the address discharge between them. A pulse voltage is then applied between display electrode 103 and display scan electrode 104 to perform the maintenance discharge. This maintenance discharge causes ultraviolet rays to occur in the cell, and the phosphor layer excited by the ultraviolet rays emits light, thereby lighting the cell. An image is displayed in combination of lighting and non-lighting of cells of respective colors.

A manufacturing method of PDP 100 is described.

The front panel is formed by the following procedures. Firstly, N stripe-like display electrodes 103 and N stripe-like display scan electrodes 104 (FIG. 2 shows only two pairs of them) are arranged alternately in parallel on front glass substrate 101. The electrodes are then covered with dielectric glass layer 105. MgO protective layer 106 is then formed on the surface of dielectric glass layer 105. Display electrodes 103 and display scan electrodes 104 are made of silver, and formed by applying a silver paste for the electrode by screen printing and then calcining it.

Dielectric glass layer 105 is formed so as to have a predetermined thickness (about 20 μm) by applying a paste containing lead-base glass material by screen printing and then calcining it at a predetermined temperature such as 560° C. for a predetermined period such as 20 minutes. As the paste containing lead-base glass material, a mixture of PbO (70 wt %), $B_2O_3$ (15 wt %), $SiO_2$ (10 wt %), $Al_2O_3$ (5 wt %), and an organic binder (ethylcellulose of 10% is dissolved in α-terpineol) is used, for example. The organic binder is produced by dissolving resin in organic solvent. As the resin, acrylic resin may be used instead of the ethylcellulose, and as the organic solvent, butylcarbitol may be used. Dispersant such as glycertrioleate may be mixed into the organic binder.

MgO protective layer 106 is made of magnesium oxide (MgO), and formed so as to have a predetermined thickness (about 0.5 μm), for example, in a spattering method or a chemical vapor deposition (CVD) method.

The back panel is formed with M address electrodes 107 arranged in parallel by applying a silver paste for the electrode onto back glass substrate 102 by screen printing and then calcining it. Address electrodes 107 are coated with a paste containing lead-base glass material by screen printing to form dielectric glass layer 108. The same paste containing lead-base glass material is repeatedly applied with a predetermined pitch by screen printing and then calcined to form barrier ribs 109. Discharge space 122 is partitioned with barrier ribs 109, cell (unit luminous region) by cell, in the line direction.

Figure 4:
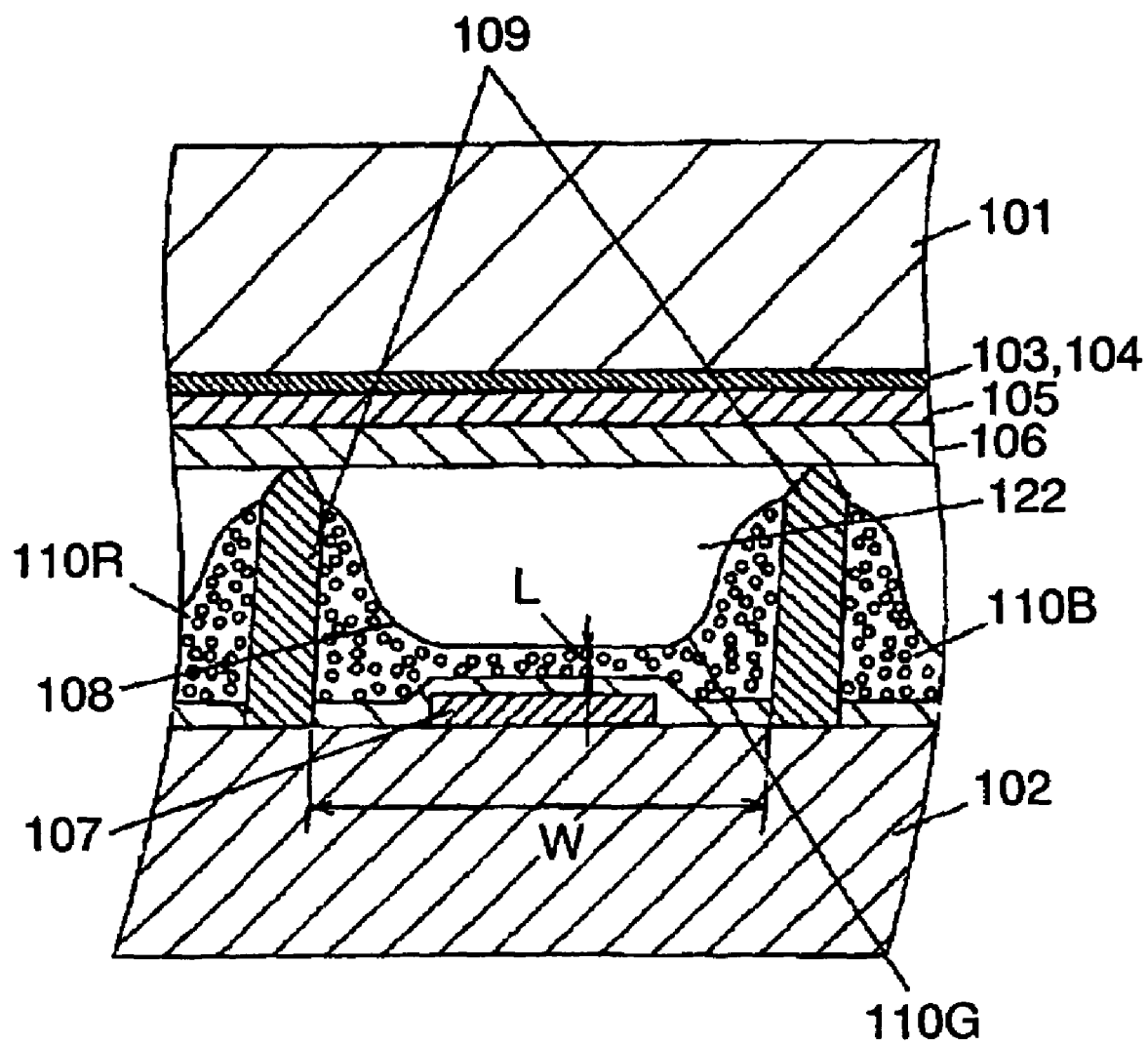
FIG. 4 is a sectional view of the structure of the image display region of the PDP.

FIG. 4 is a sectional view of PDP 100. As shown in FIG. 4, interval W of barrier ribs 109 is defined as a certain value, for example about 130 to 240 μm, in the case of HD-television (TV) of 32-inch to 50-inch. Phosphor layers 110R, 110G, 110B are formed in the following procedures. A groove between barrier ribs 109 is coated with paste-like phosphor ink composed of the following components:

red (R) phosphor particles;

blue (B) phosphor particles;

green (G) phosphor particles where monovalent element ions are substituted for Zn, Si, and Mn ions in $(Zn_{1-x}Mn_x)_2SiO_4$; and an organic binder.

The phosphor ink is then calcined at 400 to 590° C. to burn down an organic binder. Thus, respective phosphor particles are bonded to form the phosphor layers. Thickness L in the laminating direction of each of phosphor layers 110R, 110G, 110B on address electrode 107 is preferably about 8 to 25 times the average grain size of phosphor particles of each color. In other words, for securing a certain luminance (luminous efficiency) in radiating ultraviolet rays to the phosphor layers, each of phosphor layers 110R, 110G, 110B has a thickness corresponding to 8 laminations of the phosphor particles at minimum, preferably about 20 laminations, so as to absorb the ultraviolet rays occurring in discharge space 122 without transmission. When the thickness exceeds the thickness corresponding to about 20 laminations, most of the luminous efficiency of phosphor layers 110R, 110G, 110B saturate and discharge space 122 cannot be kept sufficiently large. Phosphor particles produced by hydrothermal synthesis or the like have a sufficiently small grain size and a spherical shape. A filling factor of such phosphor layers increases and the total surface area of the phosphor particles increases compared with the case of using non-spherical particles even when the number of laminations is the same. Therefore, the surface area of the phosphor particles contributing to the actual light emission of the phosphor layers increases and the luminous efficiency also increases. A synthesis method of phosphor layers 110R, 110G, 110B and a manufacturing method of green phosphor particles having substituted monovalent ions that are used in the green phosphor layer will be described later.

The front panel and the back panel that are manufactured as described above are overlaid so that each electrode of the front panel crosses each address electrode of the back panel. Glasses for sealing are disposed at the peripheral edges of the panels, and are calcined, for example, at about 450° C. for 10 to 20 minutes, thereby forming airtight seal layer 121. The front panel and the back panel are thus sealed and bonded together. The inside of discharge space 122 is temporarily transferred to a high vacuum state, for example, decompressed to $1.1 \times 10^{-4}$ Pa, and then electric discharge gas such as He—Xe-base or Ne—Xe-base inert gas is filled into the space at a predetermined pressure. Thus, PDP 100 is manufactured.

Figure 5:
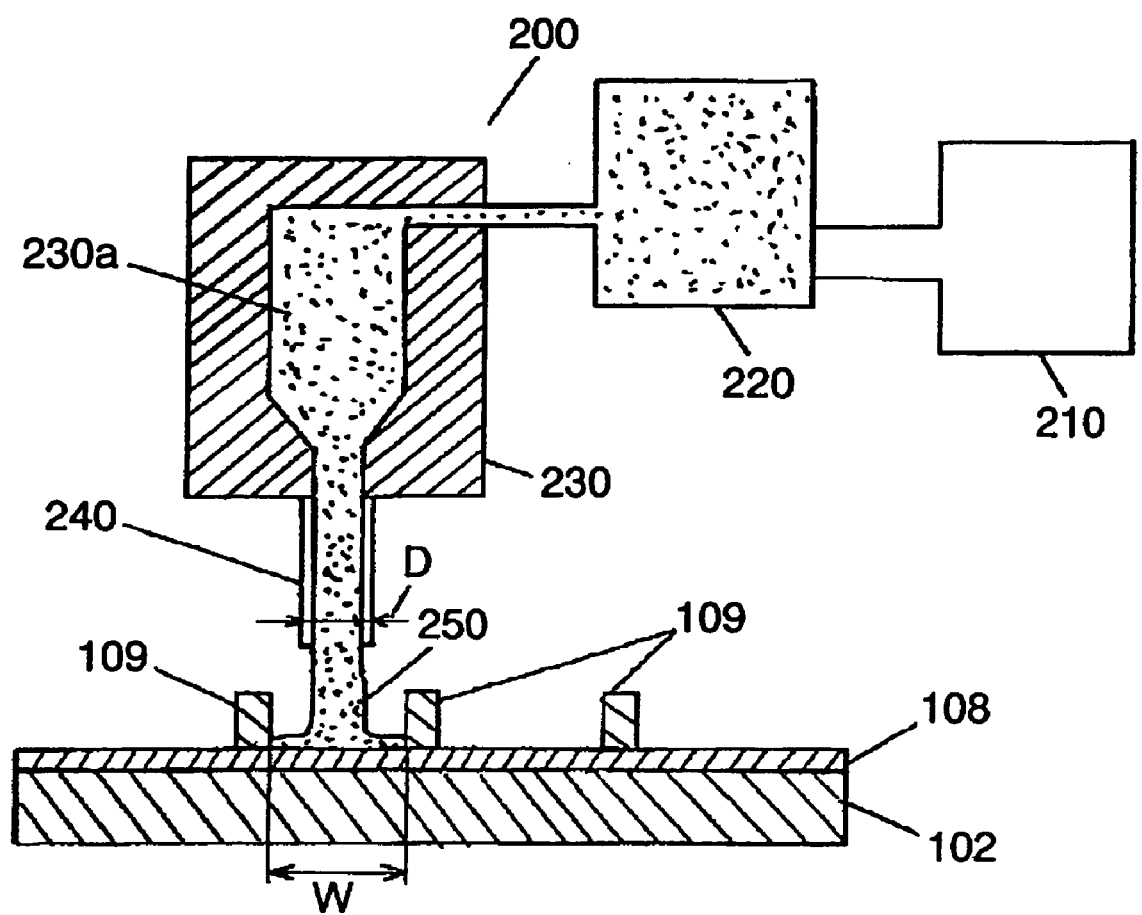
FIG. 5 is a schematic block diagram of an ink applying device used in forming a phosphor layer in the exemplary embodiment.

FIG. 5 is a schematic block diagram of ink applying device 200 used in forming phosphor layers 110R, 110G, 110B. In FIG. 5, ink applying device 200 has server 210, pressure pump 220, and header 230. The phosphor ink supplied from server 210 storing the phosphor ink is pressurized by pressure pump 220 and is supplied to header 230. Header 230 has ink chamber 230a and nozzle 240, and the phosphor ink pressurized and supplied to ink chamber 230a is continuously delivered from nozzle 240. Caliber D of nozzle 240 is preferably 30 μm or more for preventing clog of the nozzle and is not more than interval W (about 130 to 200 μm) between barrier ribs 109 for preventing the ink from squeezing out of a gap between the barrier ribs in coating. In other words, the caliber is usually set to 30 to 130 μm.

Header 230 is driven linearly by a header scan mechanism (not shown). Header 230 is driven and phosphor ink 250 is continuously delivered from nozzle 240, thereby uniformly applying the phosphor ink to a groove between barrier ribs 109 on back glass substrate 102. At this time, viscosity of the employed phosphor ink is kept in a range of 1500 to 30000 centipoises (CP) at 25° C.

Server 210 has a stirrer (not shown), and the stirring prevents precipitation of the particles in the phosphor ink. Header 230 is integrally molded with ink chamber 230a and nozzle 240, and manufactured from metallic material by equipment machining and electric discharge machining.

A forming method of the phosphor layer is not limited to the method discussed above, but various methods such as a photo lithography method, a screen printing method, and a method of placing a film including phosphor particles can be used.

The phosphor ink is produced by mixing phosphor particles of respective colors, a binder, and solvent, and by blending them so as to have a viscosity of 1500 to 30000 CP. A surfactant, silica, or dispersant (0.1 to 5 wt %) may be added. As the binder blended into the phosphor ink, ethylcellulose or acrylic resin (0.1 to 10 wt % of the ink) is used. As the solvent, α-tapineol or butyl carbitol may be used. Polymer such as poly methacrylic acid (PMA) or poly vinyl alcohol (PVA) may be used as the binder, and organic solvent such as diethylene glycol or methyl ether may be used as the solvent.

As a red phosphor blended into the phosphor ink, a compound represented by formula $(Y_{1-y}, Gd_y)_{1-x}BO_3:Eu_x$ ($0 \leq y \leq 1$) or $Y_{2-x}O_3:Eu_x$ is used. In this formula, Eu elements are substituted for part of Y elements composing the base material. Substituting ratio X of the Eu elements for the Y elements preferably satisfies $0.05 \leq X \leq 0.20$. When the substituting ratio exceeds 0.20, the initial luminance increases but the decreasing rate of the luminance increases. The compound is therefore difficult to be employed. When the substituting ratio is less than 0.05, a composition ratio of Eu largely contributing to light emission decreases and the luminance decreases. The compound cannot be therefore used as the phosphor.

As a green phosphor, a compound represented by formula $(Zn_{1-x}Mn_x)_2SiO_4$ where monovalent oxide $M_2O$ (where, M is one or more of Li, Na, K, Rb, Cs, Cu, and Ag) is added by 0.001 to 0.5 wt % is used. In $(Zn_{1-x}Mn_x)_2SiO_4$, Mn is substituted for part of Zn elements composing the base material. Substituting ratio X of the Mn elements for the Zn elements preferably satisfies $0.01 \leq X \leq 0.2$.

As a blue phosphor, a compound represented by formula $Ba_{1-x}MgAl_{10}O_{17}:Eu_x$ or 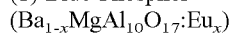$Ba_{1-x-y}Sr_yMgAl_{10}O_{17}:Eu_x$ is used. The $Ba_{1-x}MgAl_{10}O_{17}:Eu_x$ and $Ba_{1-x-y}Sr_yMgAl_{10}O_{17}:Eu_x$ are compounds where Eu and Sr are substituted for part of respective Ba composing the base materials. Substituting ratios X and Y of Eu elements for Ba elements preferably satisfy $0.03 \leq X \leq 0.20$ and $0.1 \leq Y \leq 0.5$, for the reason discussed above.

Phosphor particles used in the present embodiment are produced in the solid phase reaction method, the aqueous solution method, the spraying and calcining method, or the hydrothermal synthesis method.

(1) Blue Phosphor
($Ba_{1-x}MgAl_{10}O_{17}:Eu_x$)

In a producing process of a mixture, firstly, barium nitrate $Ba(NO_3)_2$, magnesium nitrate $Mg(NO_3)_2$, aluminum nitrate $Al(NO_3)_3$, and europium nitrate $Eu(NO_3)_3$ that are raw materials are mixed at the mole ratio 1-X:1:10:X ($0.03 \leq X \leq 0.25$), and they are dissolved into an aqueous medium, thereby producing the mixture. As the aqueous medium, ion-exchanged water and pure water are preferable because they have no impurities. However, they may contain non-aqueous solvent (methanol or ethanol).

The hydrated mixture is then injected into a vessel made of gold or platinum having corrosion resistance or heat resistance. The hydrated mixture is then hydro-thermally synthesized in a high pressure vessel using the following apparatus, in 12 to 20 hours, at a predetermined temperature (100 to 300° C.), and at a predetermined pressure (0.2 to 10 MPa). The apparatus is, for example, an autoclave allowing simultaneous pressurizing and heating.

The produced powder is calcined in a reducing atmosphere containing hydrogen by 5% and nitrogen by 95% for example, at a predetermined temperature such as 1350° C., for a predetermined period such as 2 hours. The calcined powder is classified to provide the desired blue phosphor $Ba_{1-x}MgAl_{10}O_{17}:Eu_x$.

The phosphor particles produced by the hydrothermal synthesis have a spherical shape and an average grain size of about 0.05 to 2.0 µm, namely smaller than that of phosphor particles produced by the conventional solid phase reaction. Here, "spherical" is defined such that most phosphor particles have an axial diameter ratio (shorter axial diameter/longer axial diameter) of 0.9 to 1.0, for example. All phosphor particles need not be in this range.

The blue phosphor can be produced by a spraying method of spraying the hydrated mixture from a nozzle into a high-temperature furnace to synthesize a phosphor without injecting the hydrated mixture into the vessel made of gold or platinum.

$(Ba_{1-x-y}Sr_yMgAl_{10}O_{17}:Eu_x)$

This blue phosphor is different from the blue phosphor of $Ba_{1-x}MgAl_{10}O_{17}:Eu_x$ only in raw material, and is produced in the solid phase reaction method. The employed raw material is described.

Barium hydroxide $Ba(OH)_3$, strontium hydroxide $Sr(OH)_2$, magnesium hydroxide $Mg(OH)_2$, aluminum hydroxide $Al(OH)_2$, and europium hydroxide $Eu(OH)_2$, that are raw materials are weighed so as to provide an appropriate mole ratio. They are mixed together with $AlF_3$ used as flux, and calcined for 12 to 20 hours at a predetermined temperature (1300 to 1400° C.), thereby producing $Ba_{1-x-y}Sr_yMgAl_{10}O_{17}:Eu_x$ where quadrivalent ions are substituted for Mg and Al. An average grain size of the phosphor particles obtained in the present method is about 0.1 to 3.0 µm.

The phosphor particles are calcined in a reducing atmosphere containing hydrogen by 5% and nitrogen by 95% for example, for 2 hours, and at a predetermined temperature (1000 to 1600° C.), and then are classified with an air classifier. Thus, phosphor powder is provided.

Oxide, nitrate, and hydroxide have been mainly used as raw materials of the phosphor. However, organometallic compounds containing elements such as Ba, Sr, Mg, Al, and Eu, for example metal alkoxide and acetylacetone, may be used.

(2) Green Phosphor
$[(Zn_{1-x}Mn_x)_2SiO_4]$

Zinc Nitrate $Zn(NO_3)_2$, silicon nitrate $Si(NO_3)_4$, and manganese nitrate $Mn(NO_3)_2$ that are raw materials are firstly mixed at the mole ratio 1-X:1:X (0.01≦X≦0.20) to produce a mixture. Monovalent oxide $M_2O$ (where, M is one or more of Li, Na, K, Rb, Cs, Cu, and Ag) is then mixed into the mixture by 0.001 to 0.5 wt % to $(Zn_{1-x}Mn_x)_2SiO_4$, again. The produced mixture is calcined for 2 hours at a temperature of 1000 to 1300° C., and then crushed and classified, thereby producing green phosphor particles having a grain size of 0.1 to 3 µm.

When a green phosphor is produced in the hydrothermal synthesis method, zinc nitrate $Zn(NO_3)_2$, silicon nitrate $Si(NO_3)_4$, and manganese nitrate $Mn(NO_3)_2$ that are raw materials are firstly mixed at the mole ratio 1-X:12:X (0.01≦X≦0.10) and dissolved into ion-exchanged water to produce a mixture. Hydrated solution of monovalent oxide $M_2O$ (where, M is one or more of Li, Na, K, Rb, Cs, Cu, and Ag) is then produced, and added to the mixture by 0.001 to 0.5 wt % of the phosphor.

In a hydration process, then, a basic aqueous solution such as ammonia aqueous solution is dropped into the mixture to produce hydrate. In a hydrothermal synthesis process, the hydrate and ion-exchanged water are then injected into a capsule made of platinum or gold having corrosion resistance or heat resistance, and then hydro-thermally synthesized in a high pressure vessel such as an autoclave, at a predetermined temperature such as 100 to 300° C., at a predetermined pressure such as 0.2 to 10 MPa, and for a predetermined period such as 2 to 20 hours.

The hydro-thermally synthesized product is dried to produce $(Zn_{1-x}Mn_x)_2SiO_4$ mixed with desired monovalent oxide. Thanks to the hydrothermal synthesis process, the produced phosphor particles have a grain size of about 0.1 to 2.0 µm and a spherical shape. The phosphor particles are then annealed in the air at 800 to 1300° C., and then classified to provide a green phosphor.

(3) Red Phosphor
$[(Y, Gd)_{1-x}BO_3:Eu_x]$

In a producing process of a mixture, yttrium nitride $Y(NO_3)_3$, gadolinium nitrate $Gd(NO_3)_3$, boric acid $H_3BO_3$, and europium nitride $Eu(NO_3)_3$ that are raw materials are mixed at the mole ratio 1-X:2:X (0.05≦X≦0.20) (the ratio of Y to Gd is 65 to 35). They are then thermally treated in the air for 2 hours at 1200 to 1350° C., and then classified, thereby providing a red phosphor.

$[Y_{2-x}O_3:Eu_x]$

In a producing process of a mixture, yttrium nitrate $Y(NO_3)_3$ and europium nitrate $Eu(NO_3)_3$ that are raw materials are mixed at the mole ratio 2-X:X (0.05≦X≦0.30), and dissolved into ion-exchanged water to produce a mixture.

In a hydration process, then, a basic aqueous solution such as ammonia aqueous solution is added to the mixture to produce hydrate.

In a hydrothermal synthesis process, the hydrate and ion-exchanged water are then injected into a vessel made of platinum or gold having corrosion resistance or heat resistance, and then hydro-thermally synthesized in a high pressure vessel such as an autoclave, at a temperature of 100 to 300° C., at a pressure of 0.2 to 10 MPa, for 3 to 20 hours. The produced compound is then dried to produce desired $Y_{2-x}O_3:Eu_x$. The phosphor is then annealed in the air for 2 hours at 1300 to 1400° C., and then classified to provide a red phosphor. Thanks to the hydrothermal synthesis process, the produced phosphor particles have a grain size of about 0.1 to 2.0 µm and a spherical shape. These grain size and shape are suitable for forming a phosphor layer having a high luminance characteristic.

The conventional phosphor is used in the red and blue phosphor layers of the PDP discussed above. A phosphor composed of $(Zn_{1-x}Mn_x)_2SiO_4$ for which oxide having monovalent elements is substituted is used in the green phosphor layer. A conventional green phosphor is largely apt to degrade due to hydrocarbon gas and water in each process comparing with the green phosphor of the present invention, so that luminance of the conventional green phosphor is apt to decrease in emitting green light. When the green phosphor of the present invention is used, luminance of the green cells increases, degradation in the panel manufacturing process is suppressed, and therefore color drift and address discharge failure are prevented. Therefore, when the green phosphor of the present invention is used, luminance in displaying white can be increased, and phosphor ink can be applied to the inside of the barrier ribs without clogging even with a thin nozzle.

For evaluating performance of the plasma display device of the present invention, samples in accordance the present embodiment were manufactured and performance evaluation tests on the sample were made. Test results are analyzed.

In each manufactured plasma display device, the size of the device is 42-inch (HD-TV specification with a rib pitch of 150 μm), thickness of the dielectric glass layer is 20 μm, thickness of the MgO protective layer is 0.5 μm, and distance between each display electrode and each display scan electrode is 0.08 mm. Discharge gas is gas in which xenon gas is mixed by 5% into neon as a main component, and is filled into the discharge space at a predetermined discharge gas pressure.

As a green phosphor used in the PDP of each of the samples 1 to 10, a phosphor in which monovalent oxide is partially substituted for $(Zn_{1-x}Mn_x)_2SiO_4$ is used. Respective synthesis conditions are shown in Table 1.

Each phosphor ink used for forming each phosphor layer is produced by mixing each phosphor including the phosphor particles shown in Table 1, resin, solvent, and a dispersant.

Viscosity (25° C.) of each phosphor ink is measured to be kept in the range of 1500 to 30000 CP. It is found from the observation of the phosphor layer that wall surfaces of barrier ribs in the formed phosphor layer are uniformly coated with the phosphor ink.

Caliber of a nozzle used for the coating at this time is 100 μm. An average grain size of the phosphor particles used in the phosphor layer is 0.1 to 3.0 μm, and the maximum grain size is 8 μm or less.

TABLE 1

| | Green Phosphor $(Zn_{1-x}Mn_x)_2SiO_4$ | | | Red Phosphor $(Y,Gd)_{1-x}BO_3: Eu_x$ | | Blue Phosphor $Ba_{1-x}MgAl_{10}O_{17}: Eu_x$ | |
|---|---|---|---|---|---|---|---|
| Sample No | Amount of $Eu_x$ | Manufacturing method | Kinds and ratios of substituted monovalent oxide | Amount of $Eu_x$ | Manufacturing method | Amount of $Mn_x$ | Manufacturing method |
| 1 | x = 0.01 | Solid-phase reaction method | $Li_2O$ 0.01% | x = 0.1 | Solid-phase reaction method | x = 0.03 | Hydrothermal synthesis method |
| 2 | x = 0.05 | Solid-phase reaction method | $Na_2O$ 0.01% | x = 0.2 | Solid-phase reaction method | x = 0.05 | Hydrothermal synthesis method |
| 3 | x = 0.1 | Solid-phase reaction method | $K_2O$ 0.1% | x = 0.3 | Solid-phase reaction method | x = 0.1 | Hydrothermal synthesis method |
| 4 | x = 0.2 | Solid-phase reaction method | $Rb_2O$ 0.2% | x = 0.15 | Solid-phase reaction method | x = 0.2 | Hydrothermal synthesis method |
| | | | | Red Phosphor $(Y_{1-x})_2O_3: Eu_x$ | | Blue Phosphor $Ba_{1-x-y}Al_{10}O_{17}: Eu_x$ | |
| 5 | x = 0.03 | Solid-phase reaction method | $Cs_2O$ 0.1% | x = 0.01 | Hydrothermal synthesis method | x = 0.01 y = 0.1 | Solid-phase reaction method |
| 6 | x = 0.1 | Hydrothermal synthesis method | $Cu_2O$ 0.05% | x = 0.1 | Hydrothermal synthesis method | x = 0.1 y = 0.3 | Solid-phase reaction method |
| 7 | x = 0.1 | Hydrothermal synthesis method | $Ag_2O$ 0.05% | x = 0.15 | Aqueous solution method | x = 0.1 y = 0.5 | Solid-phase reaction method |
| 8 | x = 0.2 | Solid-phase reaction method | $Li_2O$ 0.01% | x = 0.2 | Solid-phase reaction method | x = 0.2 y = 0.3 | Solid-phase reaction method |
| 9 | x = 0.2 | Solid-phase reaction method | $Li_2O$ 0.2% | x = 0.2 | Solid-phase reaction method | x = 0.2 y = 0.3 | Solid-phase reaction method |
| 10 | x = 0.1 | Solid-phase reaction method | $Li_2O$ 0.5% | x = 0.15 | Solid-phase reaction method | x = 0.1 y = 0.5 | Solid-phase reaction method |
| 11* | x = 0.1 | Solid-phase reaction method | No substituted monovalent oxide | x = 0.15 | Solid-phase reaction method | x = 0.1 y = 0.5 | Solid-phase reaction method |

*Sample No. 11 shows comparative example

In samples 1 to 4, $(Zn_{1-x}Mn_x)_2SiO_4$ is used as the green phosphor, $(Y, Gd)_{1-x}BO_3:Eu_x$ is used as the red phosphor, $Ba_{1-x}MgAl_{10}O_{17}:Eu_x$ is used as the blue phosphor, and they are combined. Table 1 shows synthesizing methods of the phosphors, substituting ratios of Mn and Eu largely contributing to the light emission, and substituting ratios (wt %) of monovalent oxide for $(Zn_{1-x}Mn_x)_2SiO_4$ and their types for the green phosphor. Here, substituting ratios of Mn and Eu mean substituting ratios of Mn for Zn and substituting ratios of Eu for Y or Ba.

In samples 5 to 10, $Y_{2-x}O_3:Eu_x$ is used as the red phosphor, $(Zn_{1-x}Mn_x)_2SiO_4$ is used as the green phosphor, $Ba_{1-x-y}Sr_yMgAl_{10}O_{17}:Eu_x$ is used as the blue phosphor, and they are combined. Table 1, similarly to the samples 1 to 4, shows methods and conditions for synthesizing of the phosphors, and substituting ratios of monovalent oxide for $(Zn_{1-x}Mn_x)_2SiO_4$ and their types for the green phosphor.

In sample 11, as the green phosphor particles, conventional phosphor particles in which substitution of monovalent oxide is not especially performed are used.

(Test 1)

Formed samples 1 to 10 and reference sample 11 are tested with respect to change of luminance of the green phosphor in the phosphor calcining process (520° C., 20 minutes) in the back panel manufacturing process, and a change rate of the phosphor of each color from the beginning to the finishing of the calcination is measured. In other words, the luminance of powder is measured before the calcination, and the luminance is measured after the application and the calcination of the paste.

(Test 2)

A change (decrease) rate of the luminance of the green phosphor from the beginning to the finishing of the panel bonding process (sealing process 450° C., 20 minutes) is measured in the panel manufacturing process.

(Test 3)

Change rates of luminance decreases are measured when a panel is lighted to display white on the entire screen and to display green. In this measurement, discharge maintaining pulses with a voltage of 200 V and a frequency of 50 kHz are applied to the plasma display device continuously for 200 hours, the panel luminances are measured before and after the application, and each change rate of luminance is calculated based on the measurement. The change rate of luminance is represented by the expression, ((luminance after the application−luminance before the application)/luminance before the application)×100.

is not adsorbed to the defects (the oxygen defects near Zn—O and Si—O) in the surface of the phosphor. Here, the hydrocarbon gas or water exists in atmosphere in calcining the phosphor, or occurs from MgO, the barrier ribs, the sealing flit material, and the phosphor (Test 5)

A phosphor in which monovalent oxide is not substituted for $(Zn_{1-x}Mn_x)_2SiO_4$ as the green phosphor is left in the atmosphere for 100 minutes, and then analyzed by a temperature desorption gas mass spectroscopic (TDS) analysis. As a result, the peak (near 100 to 400° C.) of adsorption of hydrocarbon gas in this case is 10 times higher than those in samples 1 to 10 having the added monovalent oxide.

TABLE 2

| Sample No. | Luminance decrease rate (%) of phosphor firing (520° C.) in back panel manufacturing process Green | Luminance decrease rate (%) of phosphor when panels are seald(450° C.) in panel sealing process Green | Luminance decrease rate (%) of phosphor after application of discharge susutain pulses (200 V, 100 KHz, 100 hours) White on entire screen | | Presence or absence of address faillure in address Green discharge | States of clogging after green ink is continuously applied from nozzle for 100 hours |
|---|---|---|---|---|---|---|
| 1 | −0.5 | −2.0 | −3.3 | −2.4 | Absence | No clogging |
| 2 | −0.4 | −2.1 | −3.2 | −2.2 | Absence | No clogging |
| 3 | −0.3 | −2 | −3.4 | −2.5 | Absence | No clogging |
| 4 | −0.5 | −1.9 | −3.1 | −2 | Absence | No clogging |
| 5 | −0.5 | −1.8 | −3.3 | −2.1 | Absence | No clogging |
| 6 | −0.4 | −2 | −3.6 | −2.1 | Absence | No clogging |
| 7 | −0.3 | −2.1 | −3.7 | −2.5 | Absence | No clogging |
| 8 | −0.2 | −2.2 | −3.3 | −2.3 | Absence | No clogging |
| 9 | −0.3 | −1.8 | −3.8 | −2.4 | Absence | No clogging |
| 10 | −0.2 | −2.3 | −3 | −1.8 | Absence | No clogging |
| 11* | −4.1 | −13.2 | −20.5 | −15.6 | Presence | Clogging in 4 hours |

*Sample No. 11 shows comparative example

The address failure in address discharge is determined depending on the existence of flicker of an image. When flicker occurs even at one place, the address failure is determined to occur. The luminance distribution of the panel is determined by measuring luminances of white displayed on the entire screen with a luminance meter.

(Test 4)

It is evaluated whether or not nozzle clogging occurs when green phosphor ink is applied continuously for 100 hours using a nozzle with a caliber of 100 μm.

Table 2 shows results of the luminances, luminance change rates, and the nozzle clogging in tests 1 to 4.

As shown in Table 2, reference sample 11 in which monovalent oxide is not substituted for $(Zn_{1-x}Mn_x)_2SiO_4$ as the green phosphor has a high decrease rate of luminance of green light in each process. Especially, the decrease rates of sample 11 are −4.1% in the phosphor calcining process and −13.2% in the sealing process, but those of samples 1 to 10 are lower values such as −0.2 to −0.5%, and −1.8 to −2.3%. In an acceleration life test of 200 V and 50 kHz, change rates in displaying white on the entire screen are −20.5% in sample 11 and −3.0 to −3.8% in samples 1 to 10. The change rates of luminance of green light are −15.6% in sample 11, but −1.8 to −2.4% in samples 1 to 10. In samples 1 to 10, no address failure occurs.

That is because the substitution of monovalent oxide for $(Zn_{1-x}Mn_x)_2SiO_4$ as the green phosphor largely reduces oxygen defects in the green phosphor, especially oxygen defects near Zn—O and Si—O. The reduction of the oxygen defects is caused by the fact that hydrocarbon gas or water

INDUSTRIAL APPLICABILITY

The present invention provides a plasma display device having a phosphor layer of a color corresponding to the color of each discharge cell. The phosphor layer has a green phosphor having a crystal structure of $Zn_2SiO_4$:Mn that is excited by ultraviolet rays to emit visible light, and monovalent oxide is substituted for part of the green phosphor. The monovalent oxide is one or more of lithium oxide ($Li_2O$), sodium oxide ($Na_2O$), potassium oxide ($K_2O$), cesium oxide ($Cs_2O$), rubidium oxide ($Rb_2O$), copper oxide ($Cu_{2O}$), and silver oxide ($Ag_2O$).

This structure allows reduction of oxygen defects occurring in the green phosphor, suppression of the luminance decrease of the green phosphor, and improvement of a discharge characteristic such as reduction of address discharge failure in driving the plasma display device.

The invention claimed is:

1. A plasma display device comprising:
 a plasma display panel having a plurality of discharge cells of at least one color and a phosphor layer of a color corresponding to the color of each of said discharge cells;
 wherein a phosphor constituting said phosphor layer is operable to be excited by an ultraviolet ray so as to emit light;
 wherein said phosphor layer comprises a green phosphor layer; and
 wherein said green phosphor layer includes a phosphor in which at least one monovalent oxide of a group including potassium oxide ($K_2O$), cesium oxide ($Cs_2O$), rubidium oxide ($Rb_2O$), copper oxide ($Cu_2O$), and silver oxide ($Ag_2O$) is added to a green phosphor $(Zn_{1-x}Mn_x)_2SiO_4$ ($0.01 \leq x \leq 0.2$) having a crystal structure of $Zn_2SiO_4$:Mn in an amount in a range of 0.001 wt % to 0.5 wt %.

2. A phosphor for displaying images in a plasma display device, said phosphor comprising:
a green phosphor to be incorporated into the plasma display device said green phosphor having a crystal structure of $Zn_2SiO_4$:Mn, wherein said green phosphor is operable to be excited by an ultraviolet ray so as to emit visible light,
wherein at least one monovalent oxide of a group including potassium oxide ($K_2O$), cesium oxide ($Cs_2O$), rubidium oxide ($Rb_2O$), copper oxide ($Cu_2O$), and silver oxide ($Ag_2O$) is added to the green phosphor $(Zn_{1-x}Mn_x)_2SiO_4$ ($0.01 \leq x \leq 0.2$) in an amount in a range of 0.001 wt % to 0.5 wt %.

3. A method of manufacturing a green phosphor for use in a plasma display device, the green phosphor having a crystal structure of $Zn_2SiO_4$:Mn and being operable to be excited by an ultraviolet ray so as to emit visible light, said method comprising:
producing a hydrate coprecipitate by dissolving in water an organic metallic salt or a nitrate containing elements (Zn, Si, and Mn) composing the green phosphor and elements (Rb, Cs, Cu, and Ag) composing a monovalent oxide so that a substituting ratio of a monovalent oxide $M_2O$ (where M is one of K, Rb, Cs, Cu, and Ag) for the green phosphor $(Zn_{1-x}Mn_x)_2SiO_4$ ($0.01 \leq x \leq 0.2$) is in a range of 0.001 wt % to 0.5 wt %;
calcining the hydrate coprecipitate in air; and
producing the green phosphor having a crystal structure of $Zn_2SiO_4$:Mn by again calcining the hydrate coprecipitate at a temperature in a range of 1100 to 1300° C.

4. A method of manufacturing a green phosphor for use in a plasma display device, the green phosphor having a crystal structure of $Zn_2SiO_4$:Mn and being operable to be excited by an ultraviolet ray so as to emit visible light, said method comprising:
producing a hydrate coprecipitate by dissolving in water an organic metallic salt or a nitrate containing elements (Zn, Si, and Mn) composing the green phosphor and elements (Rb, Cs, Cu, and Ag) composing a monovalent oxide so that the substituting ratio of a monovalent oxide $M_2O$ (where M is one of K, Rb, Cs, Cu, and Ag) for the green phosphor $(Zn_{1-x}Mn_x)_2SiO_4$ ($0.01 \leq x \leq 0.2$) is in a range of 0.001 wt % to 0.5 wt %;
crystallizing the hydrate coprecipitate in an autoclave; and
producing the green phosphor by calcining the hydrate coprecipitate at a temperature in a range of 1100 to 1300° C.

* * * * *

UNITED STATES PATENT AND TRADEMARK OFFICE
CERTIFICATE OF CORRECTION

| | | |
|---|---|---|
| PATENT NO. | : 7,147,802 B2 | Page 1 of 1 |
| APPLICATION NO. | : 10/478857 | |
| DATED | : December 12, 2006 | |
| INVENTOR(S) | : Kazuhiko Sugimoto et al. | |

It is certified that error appears in the above-identified patent and that said Letters Patent is hereby corrected as shown below:

<u>Claim 2</u>

In column 15, claim 2, line 4, change "display device said green" to

--display device, said green--.

Signed and Sealed this

Tenth Day of April, 2007

JON W. DUDAS
*Director of the United States Patent and Trademark Office*